US006694140B2

(12) United States Patent
Klank

(10) Patent No.: US 6,694,140 B2
(45) Date of Patent: Feb. 17, 2004

(54) CHANNEL ENTERING METHOD FOR A WIRELESS COMMUNICATION SYSTEM AND SUBSCRIBER STATION

(75) Inventor: Otto Klank, Lehrte-Arpke (DE)

(73) Assignee: Thomson Licensing S.A., Boulogne (FR)

(*) Notice: Subject to any disclaimer, the term of this patent is extended or adjusted under 35 U.S.C. 154(b) by 447 days.

(21) Appl. No.: 09/858,533

(22) Filed: May 16, 2001

(65) Prior Publication Data

US 2001/0044308 A1 Nov. 22, 2001

(30) Foreign Application Priority Data

May 17, 2000 (EP) .............................. 00250147

(51) Int. Cl.⁷ ................................ H04Q 7/20
(52) U.S. Cl. ................ 455/452.1; 455/67.14
(58) Field of Search .................... 455/62, 67.11, 455/67.14, 423, 424, 425, 450, 457, 452.1

(56) References Cited

U.S. PATENT DOCUMENTS

| 5,920,819 | A | 7/1999 | Asanuma .................. 455/447 |
| 6,009,332 | A | 12/1999 | Haartsen .................. 455/450 |
| 6,442,151 | B1 * | 8/2002 | H'mimy et al. ............ 370/333 |
| 6,456,825 | B1 * | 9/2002 | Lowdon .................... 455/62 |
| 6,535,742 | B1 * | 3/2003 | Jiang et al. ............... 455/452.2 |
| 6,539,222 | B1 * | 3/2003 | Kaindl ..................... 455/425 |

FOREIGN PATENT DOCUMENTS

| EP | 0430173 A2 | 6/1991 | ............ H04Q/7/04 |
| EP | 0635989 A1 | 1/1995 | ............ H04Q/7/38 |

* cited by examiner

*Primary Examiner*—Nguyen T. Vo
*Assistant Examiner*—Nhan T. Le
(74) *Attorney, Agent, or Firm*—Joseph S. Tripoli; Paul P. Kiel

(57) ABSTRACT

The invention relates to Channel entering method for a wireless communication system, in particular an indoor network, comprising a plurality of subscriber stations (S1 to Sn, n≥2), each of said subscriber stations (S1 to Sn) having a transmitter and a receiver, whereby information can be independently exchanged between said subscriber stations (S1 to Sn) using respective transmitters and receivers and a plurality of channels available for communication in said wireless communication system. A directional antenna is used to review a first channel (Cx) selection, whereby said first channel (Cx) is selected from a first group of channels (C1 to Cm, m≥2) of said plurality of channels available for communication between a first and a second subscriber station (Sx, Sy; 1≤x≤n, 1≤y≤n) of said plurality of subscriber stations (S1 to Sn).

11 Claims, 2 Drawing Sheets

CHANNEL ENTERING METHOD FOR A WIRELESS COMMUNICATION SYSTEM AND SUBSCRIBER STATION

The invention relates to a channel entering method for a wireless communication system, in particular an indoor network, comprising a plurality of subscriber stations, each of said subscriber stations having a transmitter and a receiver, whereby information can be independently exchanged between said subscriber stations using respective transmitters and receivers and a plurality of channels available for communication in said wireless communication system. The invention further relates to a subscriber station fore a wireless communication system.

BACKGROUND OF THE INVENTION

For private homes and also local area networks (LAN) developments are going on to connect all kinds of devices together, as TV, personal computer, stereo systems, telephone etc. Several devices located in an area and belonging to a group of dedicated users, for example in the same apartment or in the same building, may be considered to be part of a so-called cluster. This may also include near-by-stations outside the respective building. Information exchange between the devices of the cluster and optionally between the cluster devices and stations of other near-by-clusters may be based on wireless RF communication. However, a combination of wireless and wireline RF communication may also be provided.

For the RF communication between the devices and/or the outside stations there will only be a limited number of RF channels available. Devices of a cluster, and/or optionally such of different clusters which communicate with each other, use one (or optionally more than one) channel by sharing a plurality of time and/or frequency slots. This normally causes no interference problems. The devices and the stations of the various clusters may use/reuse the RF channels available for communication under certain conditions (distance, interference level, etc.). Therefore, communication signals from devices in other clusters in most cases cause interference problems with respect to communication of the devices of the cluster considered. In situations of high communication traffic, interference may prevent a reuse of the same channel and, if no more channels are available, it blocks usage of a desired service.

In order to avoid conflicting situations, before entering and using a preferred channel for communication each device separately performs a channel testing procedure. In the channel testing procedure, on the basis of communication parameters the preferred channel is tested whether it enables wireless communication, preferably optimised communication over the preferred channel.

SUMMARY OF THE INVENTION

It is an object of the present invention to disclose a channel entering method for a wireless communication system for improving communication channel efficiency.

According to the invention a channel entering method for a wireless communication system, e.g. an indoor network, comprising a plurality of subscriber stations is provided, each of said subscriber stations having a transmitter and a receiver, whereby information can be independently exchanged between said subscriber stations using respective transmitters and receivers and a plurality of channels available for communication in said wireless communication system, said method comprising the steps of:

1. Method for channel entering in a wireless communication system, in particular an indoor network, comprising a plurality of subscriber stations (S1 to Sn, n≧2), each of said subscriber stations (S1 to Sn) having a transmitter and a receiver, whereby information can be exchanged between said subscriber stations (S1 to Sn) using respective transmitters and receivers and a plurality of channels available for communication in said wireless communication system, said method comprising the steps of:
   a) using a first set of communication reference parameters (I1, M1) to test a group of channels (C1 to Cm, m≧2) of said plurality of channels available for communication between a first and a second subscriber station (Sx, Sy; 1≦x≦n, 1≦y≦n) of said plurality of subscriber stations (S1 to Sn);
   b) selecting, if a channel (Cx, 1≦x≦m) of said group of channels (C1 to Cm) meets said first set of communication parameters (I1, M1), such channel for said wireless communication between said first and said second subscriber station (Sx, Sy);
   c) testing said selected channel (Cx) by means of a directional antenna with a second set of communication parameters;
   d) accepting said selected channel (Cx) for further wireless communication between said first and said second subscriber station (Sx, Sy) and possibly further stations, if said channel meets said second set of communication reference parameters (I2, M2).

The disclosed method improves the utilisation or channel efficiency and avoids negative consequences due to more frequent (re)use of the channels in wireless communication systems. On the basis of information derived from channel testing by means of a directional antenna second communication reference parameter are provided, which in turn are used to decide whether a selected channel may be used for further communication. Using the directional antenna for channel testing in the channel entering method allows distinguishing channels with a relatively high interference power in one direction different to the sought communication direction and channels with a relatively high interference power in all directions. At least for the connections to stations located in a direction opposite to the direction of the main interferer, some other communication reference parameters can be accepted which are less demanding. If results received from directional antenna detection are taken into consideration, likelihood will increase that a channel is entered which meets communication parameters necessary for correct communication between subscriber stations in the wireless communication system. Therefore, the method disclosed improves efficiency of wireless communication in the system and decreases the overall failure rate of the wireless communication system.

Further advantageous embodiments are apparent from the dependent claims.

The invention also relates to a subscriber station for a wireless communication system, which subscriber station utilizes the method specified above.

BRIEF DESCRIPTION OF THE DRAWINGS

Exemplary embodiments of the invention are illustrated in the drawings and are explained in more detail in the following description.

In the figures.

DETAILED DESCRIPTION OF PREFERRED EMBODIMENTS

The general concept of a mixed frequency and time division multiplex communication system is described in EP-A-0 853 400. For the disclosure of the invention it is therefore expressively referred to this document, in particular to the disclosure of the channel entering process.

Figure 1:
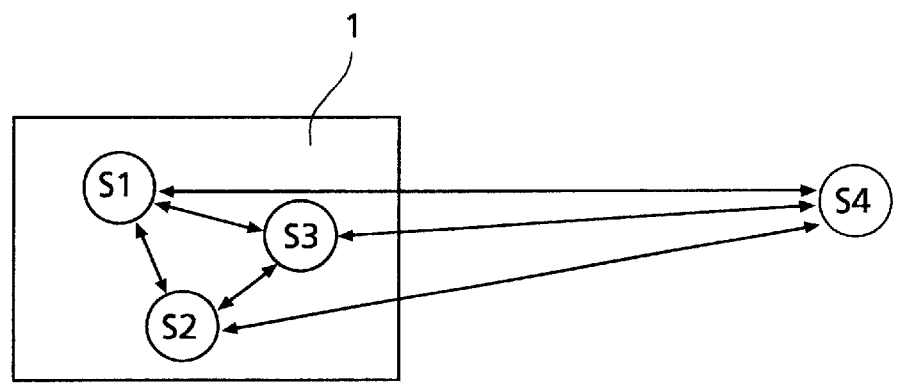
FIG. 1 shows a schematic representation of a wireless communication system.

FIG. 1 shows a RF communication system with a plurality of subscriber stations S1, . . . , S4. Three of the subscriber stations S1, S2, S3 are located within an area or cluster 1, as an apartment or a building. One subscriber station S4 is located outside the cluster 1. Subscriber station S4 is a transceiver station transmitting RF information that in principle can be received by subscriber stations S1 and/or S2 and/or S3. In addition, RF signals can be independently exchanged between the cluster subscriber stations S1, S2, S3. There may be some more stations (not shown) which cannot be received reliably by the subscriber stations S1, S2, S3 but which generate an interference level at the location of stations S1, S2, S3. The subscriber stations S1, S2, S3 may be part of a local area network (LAN) comprising, for example TES, personal computers, stereo systems, telephones etc.

For communication between the subscriber stations S1, S2, S3 and between S4 and further stations (not shown) and optionally between stations S1 S2, S3, S4 there will only be a limited number of RF channels available. The subscriber stations S1, S2, S3, S4 use the RF channels available for communication by sharing a quantity of time and/or frequency slots of a channel, and, if appropriate (e.g. different clusters), by using different channels.

Before a channel is used for communication between two or more subscriber stations, for example between S1 and S2, the channel is tested to check whether the channel meets requirements necessary for wireless communication over the channel. A set of communication reference parameters is used to proof a channel's usability for communication. In general, communication reference parameters are used to monitor the channel's transmission quality. A channel acquisition or entering process is started with testing channels available whether they are free or occupied.

Figure 2:
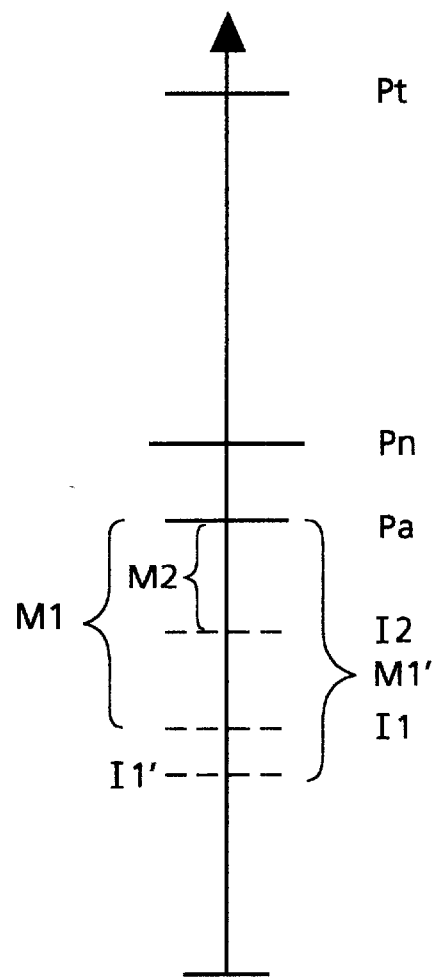
FIG. 2 shows a diagram explaining different communication reference parameters.

In FIG. 2 examples of communication reference parameters usable for channel testing are depicted. During channel testing procedure, a certain interference power reference value I1 or I2 and/or a certain margin M1 or M2 may be applied in order to separate between channels usable for communication between subscriber stations S1 and S2 and channels occupied, respectively. The interference power reference values I1 and I2 represent different levels of interference power resulting from wireless communication other than the communication under test. The test procedure may include more sophisticated methods, e.g. a correlation of the received channel signals with known (assumed) pattern or sequences in order to be able to detect relatively weak signals and distinguish between system-conform signals/interference and others (which may have different impacts and may imply application of different parameter sets).

In addition, the channel test procedure needs to take into consideration a margin M1, M2 for worse conditions (e.g. moving subscriber stations), and/or switching on another station of the considered cluster and/or a station belonging to an existing (operating) but interfering cluster), which affect the communication between subscriber stations S1 and S2 and may result in further decrease of channel efficiency or communication quality. In any case, the sum (I1+M1; I2+M2) of the respective interference power reference value I1 or I2 and the respective margin M1 or M2 has to be lower than an acceptable interference power Pa (see FIG. 2) which also is a characteristic channel parameter. The acceptable interference power Pa for a communication is a somewhat fixed parameter in the system and therefore is regarded as being a constant. This parameter is fixed due to other parameters in the communication system, such as maximum transmission power, type of allowable antennae, frequency range, error correction method, etc.

Thus, to be on the safe side, a relative big margin M1 or M2 has to be applied in channel testing. This presumably leads to a channel utilisation or efficiency far beyond theoretical values or beyond such values that could be reached if the positioning of the devices would have been known. If an adequate margin is not applied and no other measures are taken, communication may partially be interrupted, or the communication system may break down in various clusters. In order to avoid such corruptions in communication, a relatively broad margin will be used for channel testing. So the margin is regarded as a safety range for the communication. Even in cases that the local conditions (e.g. more communication traffic in neighbouring clusters, changed positions during communication, etc.) will change during communication, the communication will not be interrupted due to this margin.

The difference between a minimal input power Pm (see FIG. 2) and the interference power reference value I1 or I2 is sometimes to referred as interference distance. In FIG. 2, a transmitted power Pt and a nominal input power Pn are also depicted.

In the following a method for entering a channel, e.g. a RF channel, used for wireless communication between two subscriber stations, for example between subscriber stations S1 and S2, is described. At first, station S1 performs a channel test with a very demanding set of communication parameters I1' and M1'. In this test, an omni directional antenna is used. In the example described the set of communication reference parameters comprises the interference power reference value I1' and the margin M1' (see FIG. 2). However, the new channel entering method is independent of the number and the nature of the communication reference parameters used for channel testing. Because these parameters are very demanding, e.g. a margin of 30 dB from the acceptable interference power Pa, is required, there will sometimes be a negative result for the channel test, especially in an area of a big city, with lots of flats being concentrated in a small area. Thus, if none of the tested channels fulfil these parameters, station S1 will test the channel with a less demanding set of communication parameters I1, M1 as shown in FIG. 2. Also in this phase the test is being done with an omni-directional antenna.

Following, if at least one of the tested channels meets the set of communication reference parameters I1, M1 for the communication between the subscriber stations S1 and S2, the at least one channel is selected and the channel is entered for a first wireless communication between the subscriber stations S1 and S2. It is the station that wants to initiate a communication that selects the channel to establish a service.

The margin M1 is preferably chosen below a theoretically optimal value (which would have been used in a case without application of directional antennae). This allows further channels to be included in the following test steps.

Then, in another test phase, a directional antenna is used to review the selection of the at least one channel. By means of the directional antenna a signal arriving angle of the communication signal transmitted between the first and the second subscriber station S1, S2 is detected. This is performed, e.g. by station S2 whilst S1 transmits, e.g. a "communication request signal". In addition, a signal arriving angle of the main interference signals resulting from other communication in the wireless communication system is detected by means of the directional antenna. This test part requires that no signal is being transmitted by the other (corresponding) station, i.e. by S1 if S2 performs the test (the channel is used only partially, the signal switched off during certain time periods). Following, the detected signal arriving angle of peak signals of the communication signal and the detected signal arriving angle of peak signals of the interference signals are compared.

Figure 3:
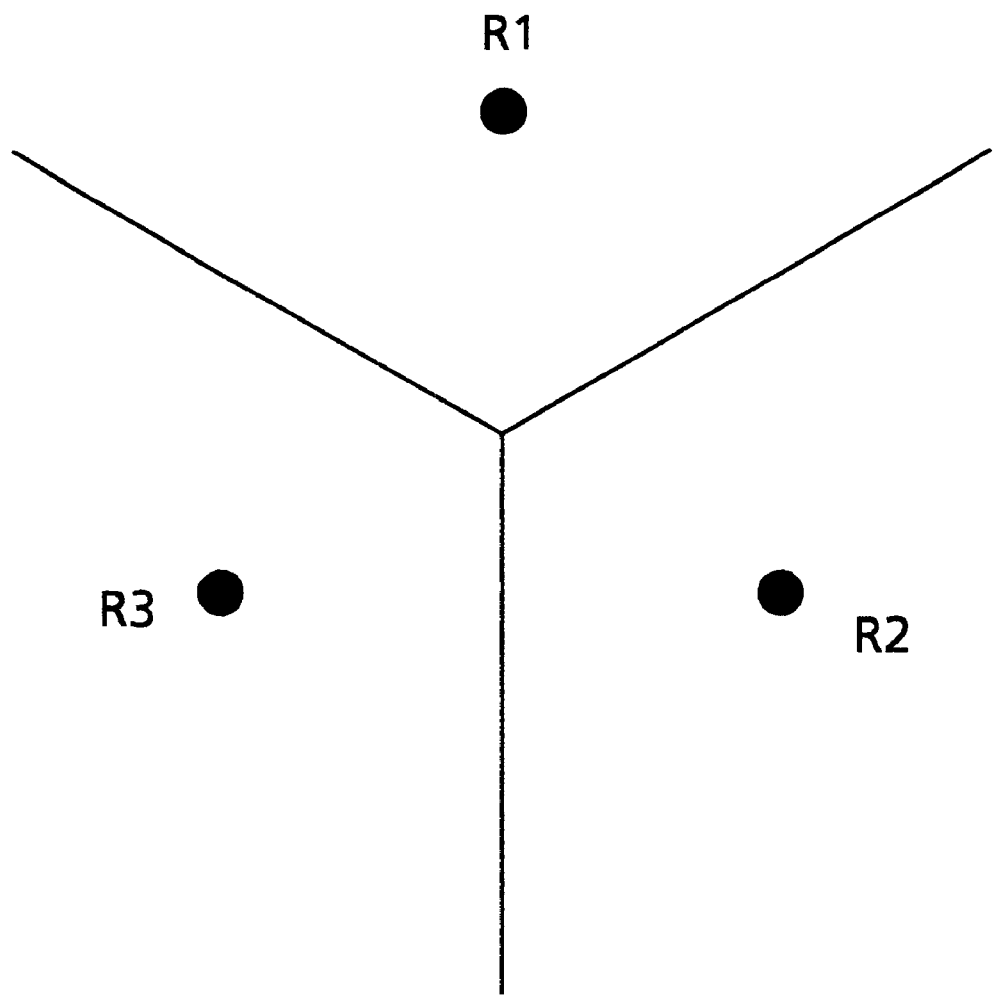
FIG. 3 an example of a directional antenna for use in the invention.

FIG. 3 shows a cross-sectional view of a directional antenna, which can be used in this invention. This antenna consists of three separate antenna rods R1, R2, R3, which can be used separately or in combination for data communication. To each antenna belongs a reflector having a "V"-form with an opening angle of 120°. The reflector serves for shielding the antenna rod against radiation from directions other than the directions falling in the opening angle. Such a kind of directional antenna is relatively simple and can also be used for portable devices. There are other types of directional antennae that can be used in this invention. For a first channel test, all the different antenna rods can be used in combination. For determining the direction of signals, the antenna rods will be used separately during reception. On the basis of the results of the signal arriving angle comparison another set of communication reference parameters I2 and M2 is provided. The at least one channel selected/entered for first communication between the subscriber stations S1 and S2 is selected for further wireless communication between the subscriber stations S1 and S2 and possibly further stations preferably of the same cluster if the selected channel meets the other set of communication reference parameters I2 and M2, which can be less or more demanding than the communication reference parameters I1, M1. Therefore, the station that performed the "review test"—e.g., as assumed before, S2 whilst S1 was transmitting a "communication request signal"—transmits a "channel acceptance" signal.

Relatively high values of the margin M corresponding with relatively low values of the interference power I are provided for the other set of communication reference parameters I2, M2, if the detected signal arriving angle of the peak signal of the communication signal and the detected signal arriving angle of the peak signal of the interference signal are equal or approximately equal, i.e. communication signal and interference signal(s) arrive from nearly the same direction. Lower values of M corresponding with higher values of I are provided for the other set of communication reference parameters I2, M2, if the detected signal arriving angle of the peak signal of the communication signal and the detected signal arriving angle of the peak signal of the interference signal differ by about 180°, i.e. communication signal and interference signal arrive from nearly opposite directions.

In the latter case the value of M2 is preferably chosen below the value of M1, which corresponds with I2 being higher than I1 (see FIG. 2). On the other hand, the test result might be ignored in the first case (similar arriving angles of the communication and interference signals) under certain conditions. For example, if station S2 performs the respective test, it can be assumed that the preceding test, based on I1, M1 and performed by station S1, covers the first case due to the fact that in this case S1 is nearer to the source of interference (which must be outside the line S1–S2).

Intermediate values may be provided for the other set of communication reference parameters I2, M2, if a difference between the detected signal arriving angle of the peak signal of the communication signal and the detected signal arriving angle of the peak signal of the interference signal lies in between the two above defined positions about 0° and about 180°.

If, while testing the channels available for communication in the wireless communication system on the basis of the set of communication parameters I1 and M1, no channel meeting communication parameters I1, M1 is found, at least one further set of communication parameters I3 and M3 may be provided for testing a group of channels anew. The at least one further set of communication parameters I3, M3 is selected to provide for wireless communication between subscriber stations S1 and S2 a channel of, compared to communication on the basis of parameters I1 and M1, still sufficient quality, so that information can be transmitted between the subscriber stations S1 and S2.

According to a further aspect of the invention, the at least one channel selected and entered for wireless communication between the subscriber stations S1 and S2 may be considered as a provisional selection. The provisionally selected channel may be used for a first set-up communication between the subscriber stations S1 and S2. The channel provisionally selected could later be reviewed on 'both sides', i.e. on the side of the subscriber station S1 and on the side of the subscriber station S2, respectively, and selected for further communication between the subscriber stations S1 and S2, only if communication can be performed with sufficient transmission quality on 'both sides'. This may include, e.g., that the transmissions in both directions (S1→S2 and S2→S1) provide sufficient low long-term error rates. For later review the directional antenna may be used.

It is to understand, that the channel entering method described is essentially independent of the method used for first channel selection as well as the set of communication parameters. In any case, after entering a channel for first communication, the first selection is reviewed by means of the directional antenna. If it is mandatory, that every subscriber station is equipped with a directional antenna, the very first test phase with communication reference values I1' and M1' can be omitted, because a verification of the channel with directional antenna is guaranteed.

The person skilled in the art will understand, that the described channel entering method may be performed by all subscriber stations S1, . . . , S4, so that overall communication efficiency can be improved in the wireless communication system.

What is claimed:

1. Method for channel entering in a wireless communication system comprising a plurality of subscriber stations, each of said subscriber stations having a transmitter and a receiver, whereby information can be exchanged between said subscriber stations using respective transmitters and receivers and a plurality of channels available for communication in said wireless communication system, said method comprising the steps of:

a) using a first set of communication reference parameters to test a group of channels of said plurality of channels available for communication between a first and a second subscriber station of said plurality of subscriber stations;

b) selecting, if a channel of said group of channels meets said first set of communication parameters said channel for said wireless communication between said first and said second subscriber station;

c) testing said selected channel by means of a directional antenna with a second set of communication parameters; and d) accepting said selected channel for further wireless communication between said first and said second subscriber station if said selected channel meets said second set of communication reference parameters.

2. Method according to claim 1, wherein said first and said second set of communication reference parameters concern a first interference value and/or a first margin for deviations from the first interference value and a second interference value and/or a second margin for deviations from the second interference value, respectively.

3. Method according to claim 2, wherein the first margin is chosen to be less than a theoretically optimal value, which would have to be applied if a test without application of directional antennae were performed.

4. Method according to claim 1, wherein the test inclusive steps b) to d) is used in cases where a preceding test according to step a) with a broader margin and no channel provides the broader margin.

5. Method according to claim 1, wherein in the case that more than one channel meet the reference values in the test step a), the channel with the lowest interference or test margin or one channel out of the class with the best values is chosen for further tests according to steps b), c) and d).

6. Method according to claim 5, wherein in the case that step d) has not been succeeded, but at least one more channel fulfilling step a) is available, at least this channel is additionally tested according to the steps b), c) and d).

7. Method according to claim 1, wherein said testing in step c) is performed with the steps of:

detecting a signal arriving angle(s) of a communication signal(s) transmitted between said first and said second subscriber station at least by one of these stations;

detecting a signal arriving angle(s) of an interference signal(s) resulting from other communication(s) between subscriber stations in said wireless communication system; and comparing said detected signal arriving angle(s) of peak signals of said communication signals with said detected signal arriving angle(s) of peak signals of said interference signals.

8. Method according to claim 7, wherein higher values of the margin M corresponding with lower values of an interference power I are provided for said second set of communication reference parameters, if said detected signal arriving angle of said peak signal of said communication signal and said detected signal arriving angle of said peak signal of said interference signal(s) are equal or approximately equal, whilst lower values of the margin M corresponding to higher values of the interference power I are provided for said second set of communication reference parameters, if said detected signal arriving angle of said peak signal of said communication signal and said detected signal arriving angle of said peak signal of said interference signal(s) differ by about 180°.

9. Method according to claim 8, wherein intermediate values are provided for said second set of communication reference parameters, if a difference between said detected signal arriving angle of said peak signal of said communication signal and said detected signal arriving angle of said peak signal of said interference signal(s) is in a range between the two ranges defined for the positions 0° and 180°.

10. Method according to claim 1, wherein said channel entering method is used for entering a channel for communication between at least one other pair of subscriber stations.

11. Subscriber station for a wireless data communication system having a directional antenna and means for performing the method according to claim 1.

* * * * *